(12) United States Patent
Johnson et al.

(10) Patent No.: US 9,233,423 B2
(45) Date of Patent: Jan. 12, 2016

(54) SELF-ALIGNING AUTOMATICALLY DRIVING DRILL APPARATUS

(71) Applicants: Mark T. Johnson, Mounds View, MN (US); Jacob A. Hauck, Hastings, MN (US)

(72) Inventors: Mark T. Johnson, Mounds View, MN (US); Jacob A. Hauck, Hastings, MN (US)

(*) Notice: Subject to any disclaimer, the term of this patent is extended or adjusted under 35 U.S.C. 154(b) by 375 days.

(21) Appl. No.: 13/887,365

(22) Filed: May 5, 2013

(65) Prior Publication Data

US 2014/0328638 A1  Nov. 6, 2014

(51) Int. Cl.
| | | |
|---|---|---|
| *B23B 45/14* | (2006.01) | |
| *B23B 45/02* | (2006.01) | |
| *B25H 1/00* | (2006.01) | |
| *B23B 49/00* | (2006.01) | |
| *B23Q 5/32* | (2006.01) | |

(52) U.S. Cl.
CPC ............. *B23B 45/02* (2013.01); *B23B 49/00* (2013.01); *B23Q 5/326* (2013.01); *B25H 1/0064* (2013.01); *B23B 2260/092* (2013.01); *B23B 2260/122* (2013.01); *B23B 2270/486* (2013.01); *Y10T 408/17* (2015.01); *Y10T 408/173* (2015.01); *Y10T 408/21* (2015.01); *Y10T 408/5647* (2015.01); *Y10T 408/56245* (2015.01); *Y10T 408/675* (2015.01); *Y10T 408/68* (2015.01)

(58) Field of Classification Search
CPC .. B25H 1/0021; B25H 1/0057; B25H 1/0064; B25H 1/0078; B23B 45/00; B23B 45/008; B23B 2260/128; B23Q 5/22; B23Q 5/40; B23Q 15/013; B23Q 17/0961; B23Q 17/22; B23Q 17/2241; B23Q 17/2428; B23Q 17/2433; B23Q 17/2447; Y10T 408/13; Y10T 408/14; Y10T 408/17; Y10T 408/172; Y10T 408/173; Y10T 408/175; Y10T 408/18; Y10T 408/20; Y10T 408/21; Y10T 408/5626; Y10T 408/5627; Y10T 408/56275; Y10T 408/5628; Y10T 408/564; Y10T 408/5647; Y10T 408/675; Y10T 408/68

See application file for complete search history.

(56) References Cited

U.S. PATENT DOCUMENTS

| | | | | |
|---|---|---|---|---|
| 1,434,946 | A * | 11/1922 | Fiorillo | 408/111 |
| 1,705,384 | A * | 3/1929 | Wikander | 408/137 |
| 2,488,992 | A * | 11/1949 | Taylor | 188/313 |
| 3,244,030 | A * | 4/1966 | Godfrey | 173/217 |
| 3,526,158 | A * | 9/1970 | Adams et al. | 408/97 |
| 3,679,320 | A * | 7/1972 | Bohorquez et al. | 408/99 |
| 3,720,135 | A * | 3/1973 | Merner et al. | 409/188 |
| 3,723,016 | A * | 3/1973 | Lehmkuhl | 408/3 |
| 4,346,444 | A * | 8/1982 | Schneider et al. | 700/173 |
| 4,534,682 | A * | 8/1985 | Carlson | 408/14 |
| 4,604,006 | A * | 8/1986 | Shoji et al. | 408/76 |
| 4,752,161 | A * | 6/1988 | Hill | 408/67 |
| 4,890,962 | A * | 1/1990 | Nydegger | 408/14 |
| 5,352,070 | A * | 10/1994 | Tehrani | 408/102 |
| 6,575,673 | B2 * | 6/2003 | Born | 408/97 |

(Continued)

FOREIGN PATENT DOCUMENTS

JP     2005111621 A  *  4/2005

*Primary Examiner* — Daniel Howell

(57) ABSTRACT

A handheld power drill apparatus includes a drill motor, a carriage motor, a drilling implement with an interchangeable locking chuck, an electronic controller, and guide plates. The guide plate is slidably mounted to accommodate different work piece thicknesses. The drilling implement is coaxially mounted on a lead screw mounting plate. The drilling implement is positioned substantially orthogonal to the workpiece. The drilling implement is automatically driven into a workpiece by the carriage motor.

5 Claims, 5 Drawing Sheets

(56) References Cited

U.S. PATENT DOCUMENTS

| | | | |
|---|---|---|---|
| 6,587,184 B2 * | 7/2003 | Wursch et al. | 356/4.01 |
| 7,374,373 B1 * | 5/2008 | Park | 408/12 |
| 7,462,004 B2 * | 12/2008 | Kopp | 408/137 |
| 7,708,505 B2 * | 5/2010 | Opsitos et al. | 408/1 R |

* cited by examiner

38

37

;
SELF-ALIGNING AUTOMATICALLY DRIVING DRILL APPARATUS

CROSS-REFERENCE TO RELATED APPLICATIONS

This Non-Provisional Patent application claims the benefit of Provisional Patent Application No. 61/688,133. Confirmation No. 8512. Filing date: May 9, 2012; Name of Applicants: Mark T. Johnson and Jacob A. Hauck; Title of that invention: Self-aligning Auto-driving Drill.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF INVENTION

The field of endeavor to which this invention pertains is that of hand-held power drills.

Description of Related Art including information disclosed under 37 CFR 1.97 and 1.98. The applicant is not aware of prior art that specifically addresses the objects of this invention, nor any that teaches the disclosed implementation. There exists art intended to address tight space drilling: (Wrobel, U.S. Pat. No. 8,246,279), (Sassatelli U.S. Pat. No. 8,382,402). Wrobel and Sassatelli both recognize the impediments surrounding drilling tight spaces. However, Wrobel and Sassatelli accomplish tight space drilling through the use of mounting the apparatus between workpieces, and are not hand-held.

There exists art using novel right-angle drill mechanisms, such as that achieved through gearing (Murphy, U.S. Pat. No. 7,484,438), that achieved by adding speeds and a larger motor (Potter, U.S. Pat. No. 6,461,088), or through attachments (Duennes, U.S. Pat. No. D439124). Murphy, Potter, and Duennes all recognize the benefits of a right-angle drill presentation, but they do not teach automatically of the drill feed. All require, to varying extent, some operator force.

Finally there exists relevant art intended to address problems of illumination (Hare, U.S. Pat. No. 7,137,761), and reducing stress on the operator (Bodine, US 20100107423 A1). Hara and Bodine do not identify anything resolved in the apparatus disclosed herein, except to illustrate that the field of hand-held right angle drills is a common field, due its usefulness.

None of the prior art teaches the three features of automatic driving of the drilling implement, together with the positional advantages of a right-hand drill, all in a hand-held apparatus.

BRIEF SUMMARY OF THE INVENTION

There exists an unmet need for tradesmen to easily align and drill straight holes in studs, joists and other work pieces. In current practice, to drill holes in studs to run electrical conduit, an operator using a conventional pistol-style drill must position himself facing the wide dimension of a 2×4 or 2×6, supply the desired angle and force, and continually push as the hole is drilled. See FIG. 1 (38) for the angle that the electrician would use to drill said hole. This is laborious because the operator must supply the force to advance the drill. He is, however, able to put his body weight "to bear" in this position. The position, however, is awkward, because he must position himself and the drill between existing studs. This space is often as little as 12 inches, and is commonly only 16 inches. Finally, this method produces holes that are angled, because due to the space limitations, the drilling implement cannot be presented substantially orthogonal to the workpiece.

An electrician can also drill conduit holes using a right-angle drill. This tool mitigates the body-position limitations, as compared to drilling with a pistol-style drill. It also allows straight holes to be drilled, because the drilling implement is presented substantially orthogonal to the stud. However, in using a right-angle drill, the operator must expend much more energy than when using a pistol-style drill, because he cannot put his body-weight to bear on a right-angle drill. He must push from the side using only his arms, which is physically taxing on the operator. This limitation effectively eliminates the use of a right-angle drill in running electrical conduit, since hundreds or even thousands of holes must be drilled in each structure.

In using the object of this invention, an automatically driving drill apparatus, as described herein, the labor to advance the drill is accomplished by the invention, without sacrificing the benefits of presenting the drilling implement orthogonally to the workpiece. See FIG. 1 (37) for the angle used for the Self-Aligning Automatically Driving Drill Apparatus described herein. This angle is the benefit derived from conventional right-angle drills. But in the Self-Aligning Automatically Driving Doll Apparatus, the Carriage Feed Motor (4) supplies all the force required to advance the drill bit, not the operator, unlike a conventional pistol-style or right-angle drill.

DETAILED DESCRIPTION OF THE INVENTION

The embodiment of the design described herein is a hand-held, power drill. The preferred embodiment is depicted on FIG. 2. The label key providing the numbers used throughout this Specification and the Drawings to identify components of the drill is found at the end of this Specification.

To begin operation, the operator will plug the Power Cord and Plug (24) into a suitable power outlet. In the preferred embodiment, the Carriage Feed Motor (4) and Drill Motor (1) are well known electric motors running on alternating current. Once the drill apparatus is powered the operator will then engage the Main Power Switch (25).

Once powered, the Carriage Feed Motor (4), which is mounted on the Feed Motor Mounting Plate (8), will begin rotating the Lead Screw (5) clockwise. The rotation of the Lead Screw (5) engages the female threads in the Drill Carriage (6), thereby guiding the Drill Carriage (6) to the right along the Linear Rails (7). The Linear Rails (7) are mounted on the Linear Rail Mounting Plate (9). The Drill Carriage (6) will travel until the Right Limit Switch (11) is triggered. Once the Right Limit Switch (11) is triggered, the Controller (23) turns off the Carriage Feed Motor (4). The operator may change the Drill Bit (3) by removing it from the Drill Chuck (2).

Figure 5:
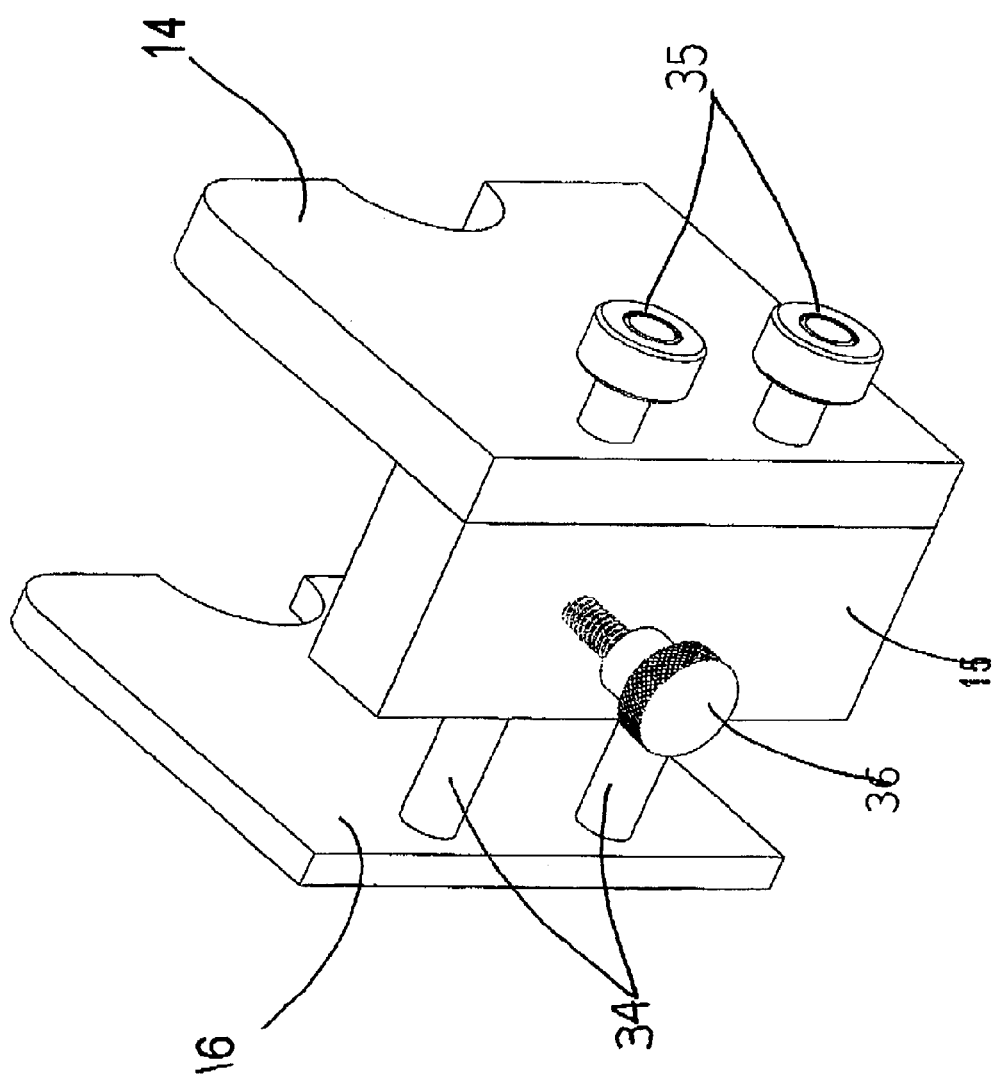
FIG. 5 depicts the preferred embodiment of the workpiece saddle.

The operator next grasps the Left and Right Hand Grips (20) which are mounted to Handle Mounting Plate (22). The operator guides the workpiece saddle, comprised of the Right Stud Plate Guide (14), Left Stud Plate Guide (16) and Stud Back Plate Guide (15), over the desired workpiece at the desired vertical location. These guide plates can be manipulated to accommodate workpieces of varying thicknesses. As depicted on FIG. 5, manual manipulation of the Shaft Collars (35) causes the Linear Guide Shafts (34) to slide the Left Stud Plate Guide (16) in or out as needed to accommodate a workpiece dimension. The Lock Knob (36) is then tightened when the desired dimension is achieved. The operator can adjust the lateral location of the hole on the workpiece by rotating the Stud Depth Adjustment Knob (17).

The operator will then engage the Start Button (21). Once the Start Button (21) has been engaged, the Controller (23) will determine if both the Upper Stud Detect Sensor (18), and the Lower Stud Detect Sensor (19), have been activated. If either, or both, of the Upper and Lower Stud Detect Sensor's are not activated, the Drill Motor (1) will not turn on. This is a safety feature. The Stud Sensors (18) and (19) may be implemented with standard micro-switches that close with pressure.

If both Upper (18) and Lower Stud Detect Sensors (19) are activated, the Drill Motor (1) will turn on. The Drill Motor is mounted on Drill Motor Mount (13). The Carriage Feed Motor (4) will also turn on, and turn the Lead Screw (5) counter-clockwise, driving the Drill Carriage (6) left toward the stud. The tip of the Drill Bit (3) will eventually trigger the Drill Tip Proximity Sensor (27). The function of the Drill Tip Proximity Sensor (27) is to sense when the Drill Bit (3) is located near the workpiece. The Drill Tip Proximity Sensor (27) may be of the inductive type, capable of sensing a metallic bit, a photo-electric sensor, or another suitable proximity sensor. When the tip of the Drill Bit (3) triggers the Drill Bit Tip Proximity Sensor (27), the Controller (23) will zero out the position of the Feed Motor Encoder (26). The Feed Motor Encoder (26) is a sensor well known in the art that provides counts of fractional turns of the motor to the Controller (23), and this information, along with information of the pitch of the Lead Screw (5) allows the Controller (23) to calculate the precise location of the Drill Bit (3) relative to its zeroed position. With the Drill Motor (1) still on, the Carriage Feed Motor (4) will continue to turn the Lead Strew (5) counter-clockwise, driving the Drill Carriage (6), and thus the Drill Bit (3), through the workpiece. The Controller (23) will stop the Carriage Feed Motor (4) when the encoder count reaches a pre-programmed encoder limit. For example, 2.5 inches of carriage travel will ensure that the Drill Bit (3) has traveled cleanly through a standard thickness workpiece. In one embodiment, the encoder limit can be user programmed to accommodate a range of desired drilling distances, for example from ½ inch to 8 inches. The user setting of the drill encoder limit may be accomplished with a dial indicating inches or fractions thereof, or other well known user input means such as a keypad. Once the encoded limit is reached, the Controller (23) reverses the direction of the Carriage Feed Motor (4), which will drive Lead Screw (5) clock-wise, which will drive the Drill Carriage (6) to the right until it encounters Right Limit Switch (11) at which point the Controller (23) will stop both the Carriage Feed Motor (4) and the Drill Motor (1). This completes the drilling cycle.

Figure 4:
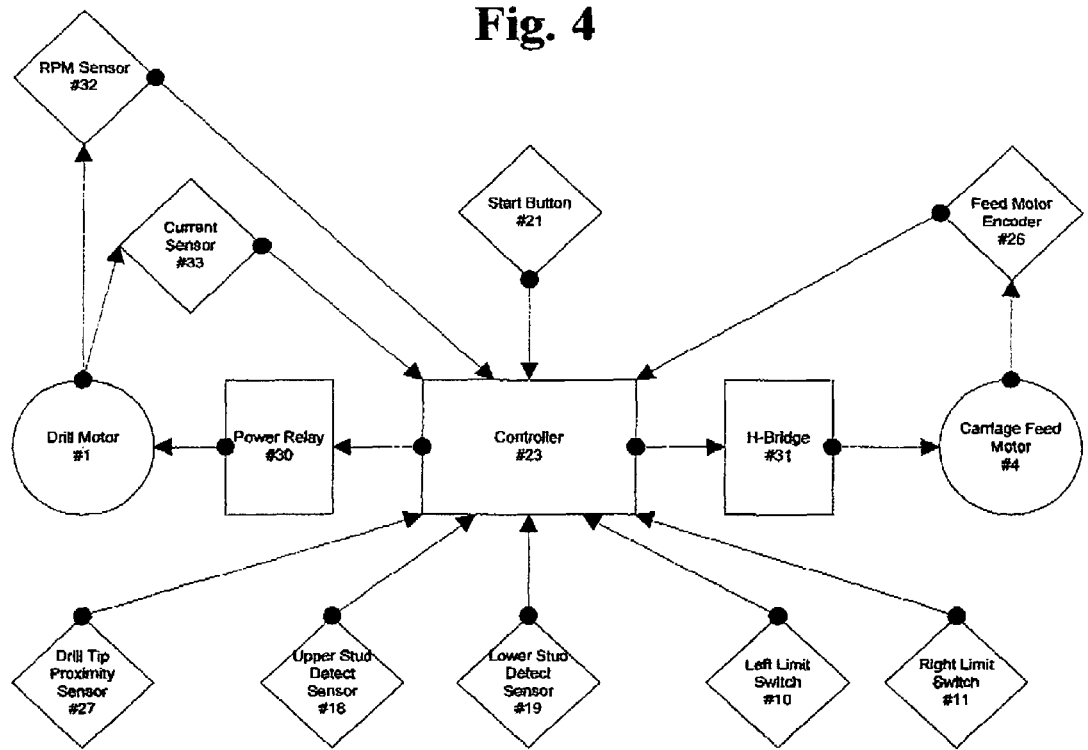
FIG. 4 depicts the preferred embodiment of the electronic subsystem in block diagram form.

The electronic subsystem block diagram is depicted in FIG. 4. The functions of all of the elements depicted on FIG. 4 have been discussed elsewhere except for Power Relay (30) and H-Bridge (31). The Power Relay (30) allows the logic output of the Controller (23) to control the on or off state of the Drill Motor (1). The H-Bridge (31) is a well-known switch configuration that allows logic signals from the Controller (23) to change the polarity of voltage to the Carriage Feed Motor (4), and thus support changes in direction. In addition, it allows the Controller (23) to disable power to the Carriage Feed Motor (4).

The RPM sensor (32) is depicted on FIG. 4. The RPM sensor (32) senses binding of the Drill Motor (1) by monitoring the RPMs of the drill motor. If the motor RPMs fall below a pre-determined limit, drill binding is likely occurring. In most cases this will be due to the hardness of a workpiece. It could also be due to a dull Drill Bit (3), or other factors. If drill binding is occurring, it is advantageous to slow the carriage advance until the RPMs recover to normal. This is accomplished by the RPM Sensor (32) relaying Drill Motor (1) RPMs to the Controller (23), which is programmed to slow or halt Carriage Feed Motor (4) until the RPMs regain their pre-programmed limit.

Figure 1:
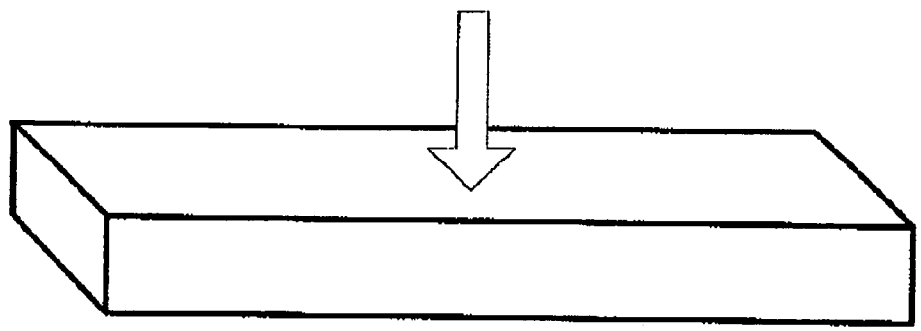
FIG. 1 depicts the angle (37) by which the operator will approach a workpiece when using the automatically driving drill apparatus, versus the angle (38) by which the operator is forced to approach a workpiece when using a conventional pistol-style drill.
Figure 1:
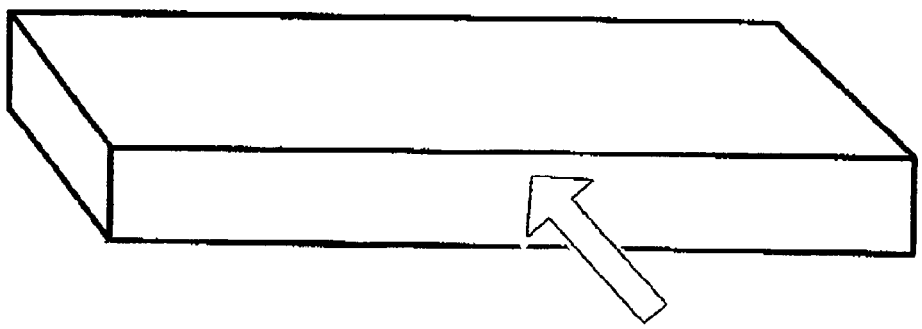
Figure 2:
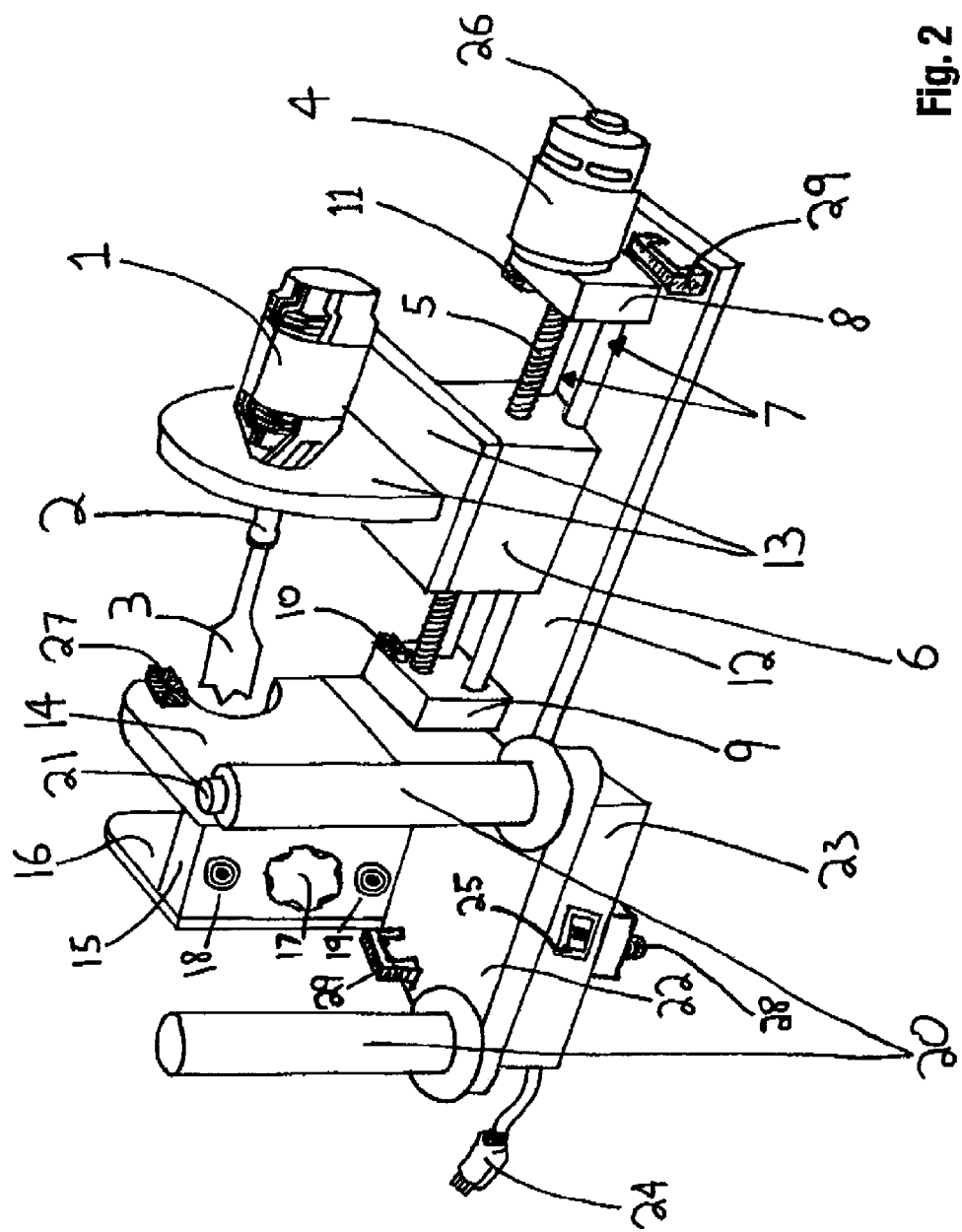
FIG. 2 depicts the preferred embodiment of the automatically driving drill apparatus described herein.
Figure 3:
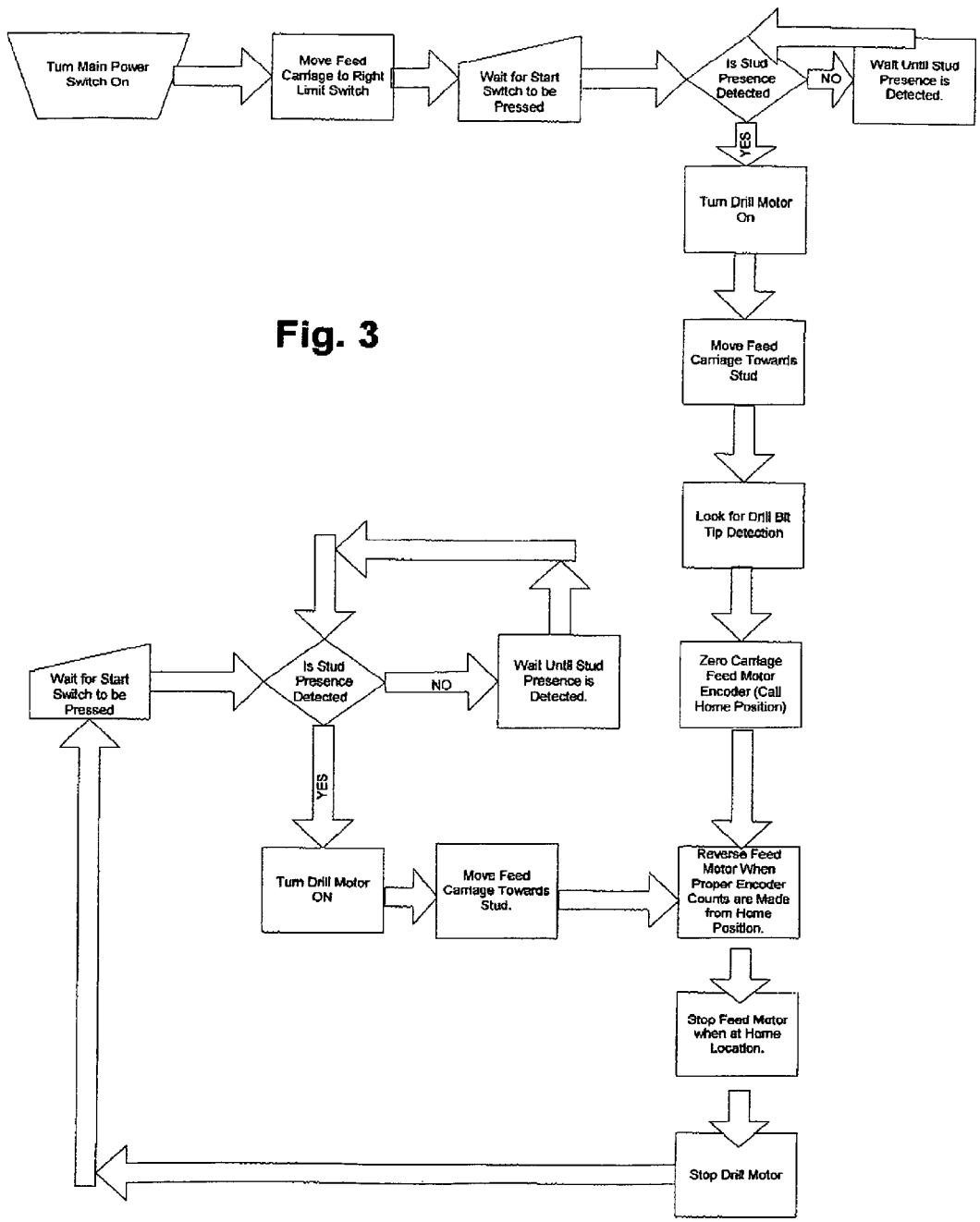
FIG. 3 depicts an illustration of the drilling cycle.

FIG. 2 depicts a Laser Distance Sensor (28) mounted on the apparatus. The Laser Distance Sensor (28) uses well known "laser ruler" technology of measuring distance to a surface, such as the floor. The Laser Distance Sensor (28) is interfaced to the Controller (23), and when the apparatus is at a desired, programmed distance from the floor, an indicator provides feedback to the user that the apparatus is at the desired drilling height. The indicator may be a lamp or LED. If the operator has the apparatus positioned too high or too low, the laser determined value will be out of range and the system logic circuitry will turn the indicator off. This feature allows the operator to drill all holes at the same height. The desired distance from the floor is user settable, using a dial or other well known user input means providing said input to the system microcontroller.

FIG. 2 depicts two Shoulder Strap Mounts (29) mounted to the apparatus. A shoulder strap connects to the Shoulder Strap Mounts (29) and is placed over the left shoulder of the operator. This feature eases the strain of holding the apparatus by disbursing the weight of the apparatus to the operator's body. This feature also increases the maneuverability of the apparatus. This completes the discussion of the preferred embodiment.

In an alternative design embodiment, a Current Sensor (33) rather than a RPM Sensor (32) is employed to monitor drill binding. The Current Sensor (33) monitors the electrical current used by the apparatus. If more current is being used than normal, it is likely drill binding is occurring. If the Current. Sensor (33) relays that current beyond the pre-determined limit is being used, the Controller (23) is programmed to slow or halt the Carriage Feed Motor (4).

An alternative design embodiment uses gearing rather than the Lead Screw (5) configuration described herein. In this embodiment, use of gearing arrangements will accomplish the same right angle position as the Lead Screw (5) configuration accomplishes. These gearing arrangements could be well known arrangements such as a worm, bevel, or spiral gear, or of another kind. The automaticity of drill feed would not be affected by an alternative gearing arrangement.

An alternative design embodiment uses the same components and processes as described in the preferred embodiment. However, some components are rearranged, and are incorporated on the left hand side of the apparatus, instead of the right side, as they are arranged in the preferred embodiment. These components include the Carriage Feed Motor (4), Feed Motor Encoder (26), and the Feed Motor Mounting Plate (8). The benefit of this embodiment is the spatial dimensions of the apparatus are reduced, increasing maneuverability. The weight distribution of the apparatus is also more balanced left-to-right with this alternative design embodiment, thus reducing operator fatigue.

An alternative design embodiment uses batteries, or another source of power, to power the Drill Motor (1) and Carriage Feed Motor (4), instead of using alternating electrical current via the Power Cord and Plug (24).

Although the invention has been described herein in what are conceived to be practical and preferred embodiments, it is recognized that departures may be made there from, and yet remain within the scope of the invention.

The following table provides the label key for the numbers used throughout this Specification and the Drawings to identify components of the drill:

1) Drill Motor
2) Drill Chuck
3) Drill Bit
4) Carriage Feed Motor
5) Lead Screw
6) Drill Carriage
7) Linear Rails
8) Feed Motor Mounting Plate
9) Linear Rail Mounting Plate
10) Left Limit Switch
11) Right Limit Switch
12) Carriage Mounting Plate
13) Drill Motor Mount
14) Right Stud Plate Guide
15) Rear Stud Plate Guide
16) Left Stud Plate Guide
17) Stud Depth Adjustment Knob
18) Upper Stud Detect Sensor
19) Lower Stud Detect Sensor
20) Left and Right Hand Grips
21) Start Button
22) Handle Mounting Plate
23) Controller
24) Power Cord and Plug
25) Main Power Switch
26) Feed Motor Encoder
27) Drill Tip Proximity Sensor
28) Laser Distance Sensor
29) Shoulder Strap Mounts
30) Power Relay
31) H-Bridge
32) RPM Sensor
33) Current Sensor
34) Linear Guide Shafts
35) Shaft Collars
36) Lock Knob
37) Depiction of angle using apparatus
38) Depiction of angle using conventional pistol style drill

We claim:

1. A hand-held drilling apparatus comprising:

a carriage mounting plate having at least one guide rail, a drill carriage slidably mounted on the at least one guide rail, a means for driving the drill carriage in forward and reverse directions along the guide rail, and a drill motor mounted on the drill carriage for rotating a drill bit having an axis of rotation oriented parallel to the guide rail;

a stationary plate guide mounted on the carriage mounting plate, a rear plate guide attached perpendicularly to the stationary plate guide, a movable plate guide slidably mounted to the rear plate guide, means to move the movable plate guide relative to the stationary plate guide in order to grip a workpiece between the plate guides, means to lock the movable plate guide in position when the workpiece is gripped, the stationary and movable plate guides being oriented perpendicularly to the axis of the drill bit, and a depth adjustment knob extending through the rear plate guide and perpendicularly to the axis of the drill bit in order to push against an edge of the workpiece to adjust the position of the axis of rotation of the drill bit relative to the edge of the workpiece;

two handgrips mounted on the carriage mounting plate adjacent the stationary and movable plate guides such that the hand grips are oriented generally perpendicularly to the axis of rotation of the drill bit and generally parallel to the stationary and movable plate guides, wherein the operator will be oriented orthogonally relative to the axis of rotation of the drill bit;

a laser distance sensor mounted on the carriage mounting plate for measuring the distance between the carriage mounting plate and a reference surface generally parallel to the axis of the drill bit, such that the axis of the drill bit may be located at a desired distance from the reference surface when multiple holes are drilled on spaced workpieces.

2. The hand-held drilling apparatus according to claim 1, further comprising:

a shoulder strap mount located at each end of the carriage mounting plate for attachment of a strap that may be looped over the operator's shoulder.

3. The hand-held drilling apparatus according to claim 1, further comprising:

means for measuring the travel distance of the drill bit within the workpiece.

4. The hand-held drilling apparatus according to claim 3, further comprising:

means for setting the desired travel distance of the drill bit within the workpiece.

5. The hand-held drilling apparatus according to claim 3, further comprising:

workpiece detecting sensors, said sensors requiring activation prior to commencement of the drilling cycle.

* * * * *